H. W. DAVIS.
BOLT FOR PISTON FOLLOWER PLATES.
APPLICATION FILED MAY 16, 1911.
1,018,741.
Patented Feb. 27, 1912.
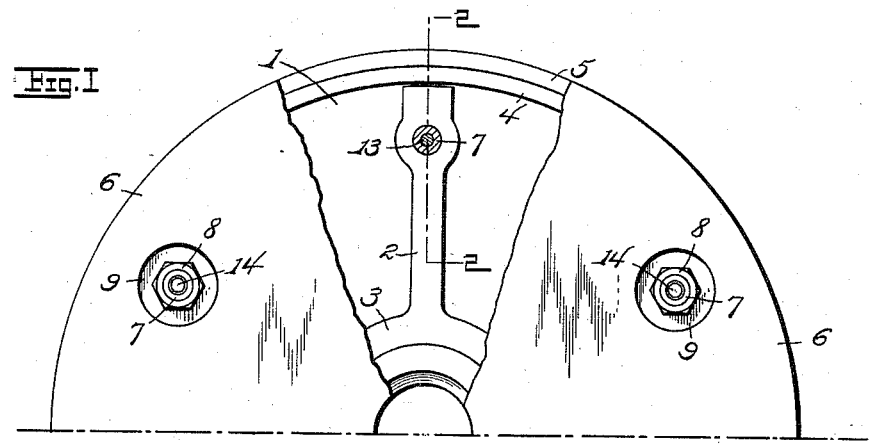
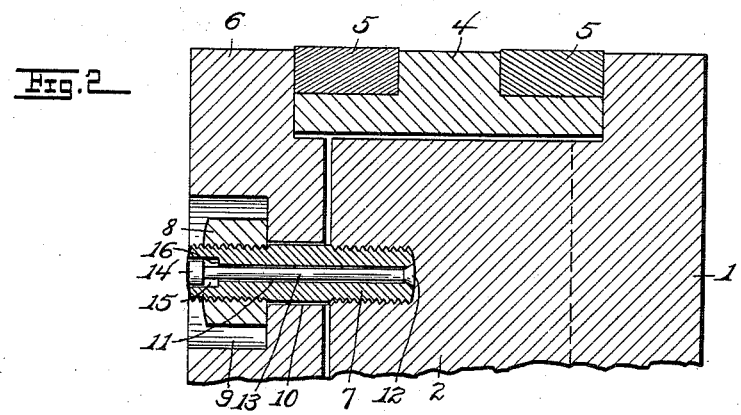
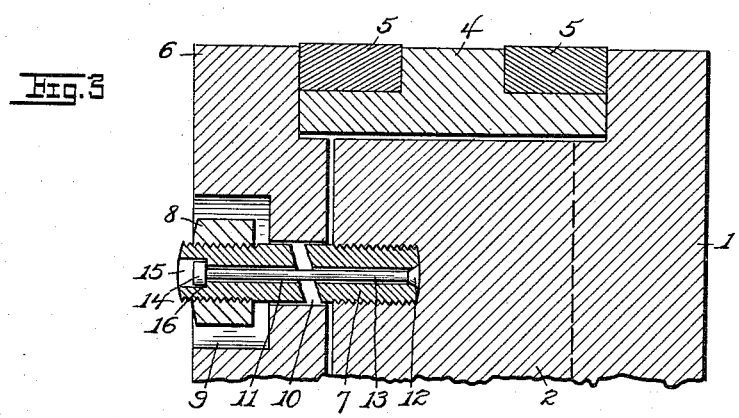
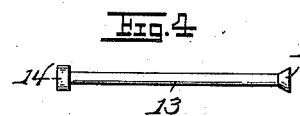
WITNESSES:
F. E. Arthur.
Bruce Morris.
INVENTOR
Henry W. Davis.
BY
N. E. Dunlap
ATTORNEY.

UNITED STATES PATENT OFFICE.

HENRY W. DAVIS, OF MARTINS FERRY, OHIO.

BOLT FOR PISTON FOLLOWER-PLATES.

1,018,741.      Specification of Letters Patent.      Patented Feb. 27, 1912.

Application filed May 16, 1911. Serial No. 627,619.

*To all whom it may concern:*

Be it known that I, HENRY W. DAVIS, a citizen of the United States of America, and resident of Martins Ferry, county of Belmont, and State of Ohio, have invented certain new and useful Improvements in Bolts for Piston Follower-Plates, of which the following is a specification.

This invention relates broadly to improvements in bolts, and specifically to a bolt for attaching piston follower-plates, and the like.

The primary object of the invention is to provide a bolt for attaching or securing follower-plates upon the faces of pistons, which is provided with means whereby, when broken, the broken outer end will be supported and prevented from dropping out into the interior of the cylinder between the piston and the cylinder-head.

As is well known, the ordinary bolts, by means of which piston follower-plates are secured in place, frequently break in two while the engine is in operation, and the outer ends, being thus freed, work out and drop down between the moving piston and the cylidner head. The result of this is oftentimes disastrous, not only to the engine itself, but also to life and adjacent property, since the connections between the cylinder and its head are disrupted by the bolt end being forcibly thrust by the piston against said head, allowing the latter to blow off.

The purpose of the present invention is to obviate the objection to the use of the ordinary types of bolts above noted.

A further object within the contemplation of this invention is to provide a bolt having means whereby, when the cylinder head is removed for piston inspection, the presence of broken bolts may be readily detected.

The invention accordingly consists in the features of construction, combinations of elements and arrangement of parts which will hereinafter be exemplified, reference being had to the accompanying drawing, forming a part of this specification, in which—

Figure 1 is a front end elevation of a portion of a piston, a portion of the follower-plate being broken away, showing a cross-section of the bolt; Fig. 2 is an enlarged longitudinal sectional view of a fragmentary portion of a piston to which the invention is applied, said section being taken on the line 2—2, Fig. 1; Fig. 3 is a similar view, showing the bolt broken in two; and Fig. 4 is a side elevation of the tie-pin, detached.

Referring to said drawing, in which like designating characters distinguish like parts throughout the several views—1 indicates the body, 2 one of the radial arms or spokes extending outward from the nave 3, 4 the junk-ring, 5 the packing rings, and 6 the follower-plate of an ordinary type of piston.

For attaching or securing the follower-plate 6 to the arms or spokes 2, which arms or spokes may be integral with the body 1, as shown, I provide a plurality of bolts 7 of stud-bolt type. The inner threaded end of each bolt is seated in the arm or spoke 2, while a nut 8 is drawn up on the outer threaded end thereof, said nut being received in a socket 9 provided therefor in the outer face of the follower-plate. The unthreaded intermediate portion of the bolt is received in the hole 10 in the follower-plate, as shown.

The bolt 7 has a central longitudinal bore 11 extending therethrough, which, at its inner end, is outwardly flared to form a seat for the reception of the spread or upset inner end 12 of a tie-pin 13 which lies in said bore. The opposite, or outer, end of said pin has a head 14 formed thereon, which head lies within a socket 15 provided in the outer end of the bolt, said socket being of larger diameter than the bore 11 with which it registers, and an annular shoulder 16 being formed at the junction of said socket and said bore. Said head 14 normally occupies an unseated position—that is to say, the head lies within and at the outer extremity of the socket.

Should the bolt be broken in two, the freed outer end thereof will move outward until the shoulder 16 engages the head 14, as shown in Fig. 3. Said end will there be supported by the rigidly held tie-pin and thus prevented from falling out of the piston. In this position the knocking of the freed end against the cylinder-head with each outward stroke of the piston should ordinarily serve to apprise an attendant of the broken bolt. Should this warning be unnoticed or unheeded, no injury or damage would ordinarily be occasioned, since the remaining bolts would, under ordinary circumstances, serve to retain the follower-plate in place. When the cylinder head has been removed for piston inspection, any broken bolts may readily be detected by simple observation of the relative positions of the outer ends of the bolt and the heads 14 of the pins, since, as hereinbefore indicated, the said heads normally occupy positions in the outer ends of the sockets 15.

From the foregoing it will be seen that I provide an extremely simple and efficient device for preventing damage incident to the breaking of follower-plate securing-bolts. It will further be seen that various slight changes or alterations, within the scope of the appended claims, may be resorted to without departing from the general spirit or scope of the invention.

Having thus described my invention, what I claim as new and desire to secure by Letters Patent, is—

1. A bolt for follower-plates, comprising a one-piece bolt-body having a longitudinal smooth bore therethrough, and a pin mounted in said bore for preventing dissociation of the opposite ends of said body when the latter is broken.

2. A bolt for follower-plates, comprising a one-piece bolt-body having a longitudinal unthreaded bore therethrough, and a tie-pin mounted in said bore and having connection with the opposite ends of the body whereby, when the latter is broken, the parts are held in substantially fixed relation.

3. A bolt for follower-plates, comprising a one-piece bolt-body having a longitudinal unthreaded bore therethrough, and a tie-pin mounted in said bore in fixed relation to one end of the body, said pin having a head on its opposite end for preventing dissociation of the freed end of the body when the latter is broken.

4. A bolt for follower-plates, comprising a bolt-body of stud-bolt type composed of a single piece having a longitudinal bore therethrough, and a tie-pin of greater length than said bore mounted in the latter and having heads on its opposite ends in interlocking relation to the opposite ends of the body, whereby, when said body is broken in two, the dissociation of the parts is prevented, one of such broken parts being permitted to freely move outward against one of said heads.

5. A bolt for follower-plates, comprising a one-piece bolt-body having a longitudinal unthreaded bore therethrough, a tie-pin mounted in said bore and having heads on its opposite ends in interlocking relation to the opposite ends of the body, whereby, when said body is broken in two, the dissociation of the parts is prevented, and visible means for indicating the condition of said body.

6. A bolt comprising a one-piece bolt-body having a socket in its outer end and a central unthreaded bore extending therethrough, a pin mounted in said bore with its inner end in fixed relation to the inner end of said body, and a head formed on the outer end of said pin and occupying a position in said socket.

7. A bolt comprising a one-piece bolt-body having a socket in its outer end and a central bore extending therethrough, a pin mounted in said bore with its inner end in fixed relation to the inner end of said body, and a head formed on the outer end of said pin, said head normally occupying a position in the outer end of said socket.

8. A bolt comprising a one-piece bolt-body having a socket in its outer end and a central bore extending therethrough, an annular shoulder being formed at the junction of said socket and said bore, a pin mounted in said bore with its inner end in fixed relation to the inner end of said body, and a head formed on the outer end of said pin, said head normally occupying an unseated position in said socket and being adapted to seat on said shoulder when the outer end of said body moves outward, as when the latter is broken in two.

In testimony whereof I affix my signature in presence of two subscribing witnesses.

HENRY W. DAVIS.

Witnesses:
H. E. DUNLAP,
BRUCE MORRIS.

---

Copies of this patent may be obtained for five cents each, by addressing the "Commissioner of Patents, Washington, D. C."